(12) United States Patent
Wasamoto et al.

(10) Patent No.: US 10,148,830 B2
(45) Date of Patent: Dec. 4, 2018

(54) CONTROL METHOD OF A PRINTER, PRINTER AND PRINTER SET WITH MEMORY ATTACHED TO A COMMUNICATION CABLE

(71) Applicant: Seiko Epson Corporation, Tokyo (JP)

(72) Inventors: Tsuyoshi Wasamoto, Matsumoto (JP); Makoto Ikeda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/349,178

(22) Filed: Nov. 11, 2016

(65) Prior Publication Data

US 2017/0142266 A1 May 18, 2017

(30) Foreign Application Priority Data

Nov. 16, 2015 (JP) .................................. 2015-223679

(51) Int. Cl.
*G06F 3/12* (2006.01)
*H04N 1/00* (2006.01)

(52) U.S. Cl.
CPC ....... *H04N 1/00233* (2013.01); *H04N 1/0083* (2013.01); *H04N 1/00204* (2013.01); *H04N 1/00973* (2013.01)

(58) Field of Classification Search
CPC ........... H04N 1/00233; H04N 1/00204; H04N 1/00342; H04N 1/00891; H04N 1/00901; H04N 1/00896; H04N 1/0083; H04N 1/00973; H04N 2201/0094; G06F 3/1203; G06F 3/1209; G06F 3/1229; G06F 3/1236; G06F 3/1284; G06F 3/1285

USPC ......................................... 358/1.1–1.18, 402
See application file for complete search history.

(56) References Cited

U.S. PATENT DOCUMENTS

| | | | |
|---|---|---|---|
| 2006/0146355 A1* | 7/2006 | Kim ...................... | G06F 3/1204 358/1.13 |
| 2007/0168564 A1* | 7/2007 | Conley ............... | G06F 12/0866 710/1 |
| 2008/0297843 A1* | 12/2008 | Aoki ...................... | G06F 3/1208 358/1.15 |
| 2009/0051956 A1* | 2/2009 | Kondo .................... | G06F 21/34 358/1.13 |
| 2009/0185218 A1 | 7/2009 | Azami | |
| 2009/0262382 A1* | 10/2009 | Nobutani ................ | H04L 12/10 358/1.15 |

(Continued)

FOREIGN PATENT DOCUMENTS

| | | |
|---|---|---|
| JP | 2009-175951 A | 8/2009 |
| JP | 2011-164872 A | 8/2011 |
| JP | 2013-052556 A | 3/2013 |

*Primary Examiner* — Gabriel Garcia
(74) *Attorney, Agent, or Firm* — Foley & Lardner LLP

(57) ABSTRACT

A printer control method enables even non-technical users to quickly and accurately set printer information in a printer. A control method of a printer having a first interface that connects through a first communication cable to a host computer, and a second interface that connects to nonvolatile memory storing printer information through a second communication cable, the nonvolatile memory being attached to the first communication cable, reads the printer information from the nonvolatile memory through the second communication cable and the second interface, and sets the read printer information in the printer, at a specific time.

20 Claims, 9 Drawing Sheets

(56) References Cited

U.S. PATENT DOCUMENTS

2011/0205581 A1    8/2011  Machii et al.
2013/0057911 A1    3/2013  Hirakawa
2016/0330340 A1*  11/2016  Minamino ......... H04N 1/00962

* cited by examiner

CONTROL METHOD OF A PRINTER, PRINTER AND PRINTER SET WITH MEMORY ATTACHED TO A COMMUNICATION CABLE

This application claims priority under 35 U.S.C. § 119 to Japanese Patent Application No. 2015-223679 filed on Nov. 16, 2015, the entire disclosure of which is expressly incorporated by reference herein.

BACKGROUND

1. Technical Field

The present invention relates to a control method of a printer, a printer, and a printer set, and relates more specifically to a control method of a printer, a printer, and a printer set that enable a non-technical user to quickly and appropriately set printer information such as the IP address and printing conditions in a printer.

2. Related Art

Printers (network printers) that communicate with a host computer using a network address such as an IP address are known from the literature.

When one printer of this type (referred to below as the original printer) is replaced with another printer (referred to below as the replacement printer) (such as when a malfunctioning printer is replaced with a separate, normally operating printer), printer information, such as the IP address of the original printer, must be transferred to the replacement printer.

However, because some degree of technical knowledge or a dedicated computer is required to set the printer information (configuration) in the replacement printer, it is difficult for a non-technical user (such as a store employee) to quickly and accurately set the printer information in the replacement printer when the printer is installed in a supermarket in which a POS system is deployed, for example.

To solve this problem, JP-A-2011-164872 proposes reading the printer information from a USB memory stick or other external memory device and setting the printer information read from the external memory device in the replacement printer when an original printer is replaced.

While the method of JP-A-2011-164872 enables setting the printer information in the replacement printer relatively easily, the following problems persist.

First, an external memory device must be prepared whenever a printer is replaced. Second, managing the external memory devices is difficult, and preparing an external memory device accurately storing the printer information that should be set in the replacement printer is time-consuming. Third, the external memory device may mistakenly be prepared with printer information other than the printer information that should be set in the replacement printer, resulting in the wrong printer information being set in the replacement printer. Fourth, such external memory devices are easily lost.

A non-technical user may therefore not be able to quickly configure the replacement printer with the correct printer information.

SUMMARY

A control method of a printer, a printer, and a printer set according to the invention enable even non-technical users to quickly and correctly configure printer information (such as the IP address and printing conditions) in a printer (such as a replacement printer or a new printer).

To achieve the foregoing objective, a control method of a printer according to a first aspect of the invention is a control method of a printer having a first interface and a second interface, the first interface connecting to a host computer through a first communication cable, the second interface connecting to memory storing printer information through a second communication cable, the control method including: installing the memory to the first communication cable; and reading the printer information from the memory through the second communication cable and second interface, and setting the read printer information in the printer, at a specific time.

The control method of a printer according to this aspect of the invention differs from the related art by having memory (herein, specifically memory storing printer information) directly connected to the first communication cable, that is, memory is physically attached to the first communication cable, and as a result has the following effect.

First, preparing a separate external memory device each time a printer is replaced (or newly installed) is not necessary. Second, managing the memory device is easier than in the related art, and suitable memory storing printer information that should be set in the printer (such as a replacement printer) can be provided more quickly than in the related art. Third, there is no possibility that memory other than the memory storing the printer information that should be set in the printer (such as a replacement printer) will be mistakenly prepared, and as a result the correct printer information can be reliably set in the replacement printer. Fourth, there is no chance of losing the memory.

As described above, the control method of a printer according to this aspect of the invention enables even a non-technical user to quickly and correctly set the printer information (such as the IP address and printing conditions) in a printer (such as the replacement printer).

In a control method of a printer according to a second aspect of the invention, the printer information includes at least one of an IP address or a printing condition.

The control method of a printer according to the second aspect of the invention enables even a non-technical user to quickly and correctly set at least one of the IP address and printing conditions in a replacement printer.

A control method of a printer according to a third aspect of the invention further includes: determining if at least part of the printer information set in the printer changed; and if at least part of the printer information set in the printer changed, writing the updated printer information to the memory through the second communication cable and second interface.

The control method of a printer according to the third aspect of the invention enables even a non-technical user to quickly and correctly set updated printer information that was changed on the original printer in a replacement printer.

In a control method of a printer according to a fourth aspect of the invention, at least part of the printer information set in the printer may be changed based on information from the host computer.

The control method of a printer according to the fourth aspect of the invention enables even a non-technical user to quickly and correctly set updated printer information that was changed based on an operation of the host computer in a replacement printer.

A control method of a printer according to a fifth aspect of the invention further includes: disconnecting the first communication cable from the first interface and connecting the disconnected first communication cable to the first interface of a printer other than the original printer, and disconnecting the second communication cable from the second interface and connecting the disconnected second communication cable to the second interface of the other printer after the updated printer information is written to the memory; and at a specific time, reading the updated printer information from the memory through the second communication cable and the second interface, and setting the updated printer information that was read in the other printer.

The control method of a printer according to this aspect of the invention also enables setting printer information of the original printer in a replacement printer by the extremely simple process of disconnecting the first communication cable from the first interface of the original printer, connecting the disconnected communication cable to the first interface of the replacement printer, disconnecting the second communication cable from the second interface of the original printer, and connecting the disconnected second communication cable to the second interface of the replacement printer.

In a control method of a printer according to a sixth aspect of the invention, the first interface is a LAN connector, and the second interface is an RJ11 connector.

Furthermore, because the control method of a printer according to this aspect of the invention uses a LAN connector and a RJ11 connector, a LAN cable (typically an Ethernet® cable) can be used as the first communication cable, a modular cable can be used as the second communication cable, and highly reliably communication can be achieved at a low cost.

In a control method of a printer according to a seventh aspect of the invention, the second interface is an interface used to connect a cash drawer to the printer.

Furthermore, because the control method of a printer according to this aspect of the invention uses the connector (drawer kick-out connector) provided for connecting a cash drawer to a printer as the connector to which the memory connects, a separate, dedicated connector for connecting the memory is not necessary, and the parts count and number of assembly steps can be reduced accordingly.

A control method of a printer according to an eighth aspect of the invention further includes: detecting if the memory is connected to the second interface; setting at least one terminal in the second interface as a terminal used to access the memory if the memory is connected to the second interface; and setting at least one terminal in the second interface as a terminal used to control the cash drawer if the cash drawer is detected connected to the second interface, or connection of the memory is not detected.

The control method of a printer according to this aspect of the invention detects if a memory is connected to the second interface, based on the detected result assigns one pin of the second interface as a terminal for accessing the memory or as a terminal for controlling the cash drawer, and eliminates the need to configure the appropriate terminals manually.

In a control method of a printer according to a ninth aspect of the invention, the specific time is when the power switch of the printer turns on while the second interface and the memory are connected by the second communication cable, or is when connection of the second interface to the memory by the second communication cable is detected while the power switch of the printer is on.

The control method of a printer according to this aspect of the invention can set the printer information in the replacement printer by the extremely simple process of connecting the second interface and memory through the second communication cable, and then turning the power switch of the replacement printer on. The printer information can also be set in the replacement printer by the extremely simple process of connecting the second interface and memory through the second communication cable when the power switch of the printer is on.

A first aspect of a printer according to the invention has: a first interface configured to connect to a host computer through a first communication cable; a second interface configured to connect to memory storing printer information through a second communication cable, the memory being installed to the first communication cable; a printer information reading unit (a printer information reader) configured to read the printer information from the memory through the second communication cable and second interface at a specific time; and a printer information setting unit (a printer information setter) configured to set the printer information read by the printer information reading unit in the printer.

A printer according to this aspect of the invention enables even non-technical users to quickly and accurately set printer information (such as the IP address or printing conditions) in the printer.

A first aspect of a printer set according to the invention includes: the printer of the invention, and a memory module including a housing to which the first communication cable can connect, and the memory installed in the housing.

A printer set according to this aspect of the invention enables even non-technical users to quickly and accurately set printer information (such as the IP address or printing conditions) in the printer.

Other objects and attainments together with a fuller understanding of the invention will become apparent and appreciated by referring to the following description and claims taken in conjunction with the accompanying drawings.

DESCRIPTION OF EMBODIMENTS

Figure 1:
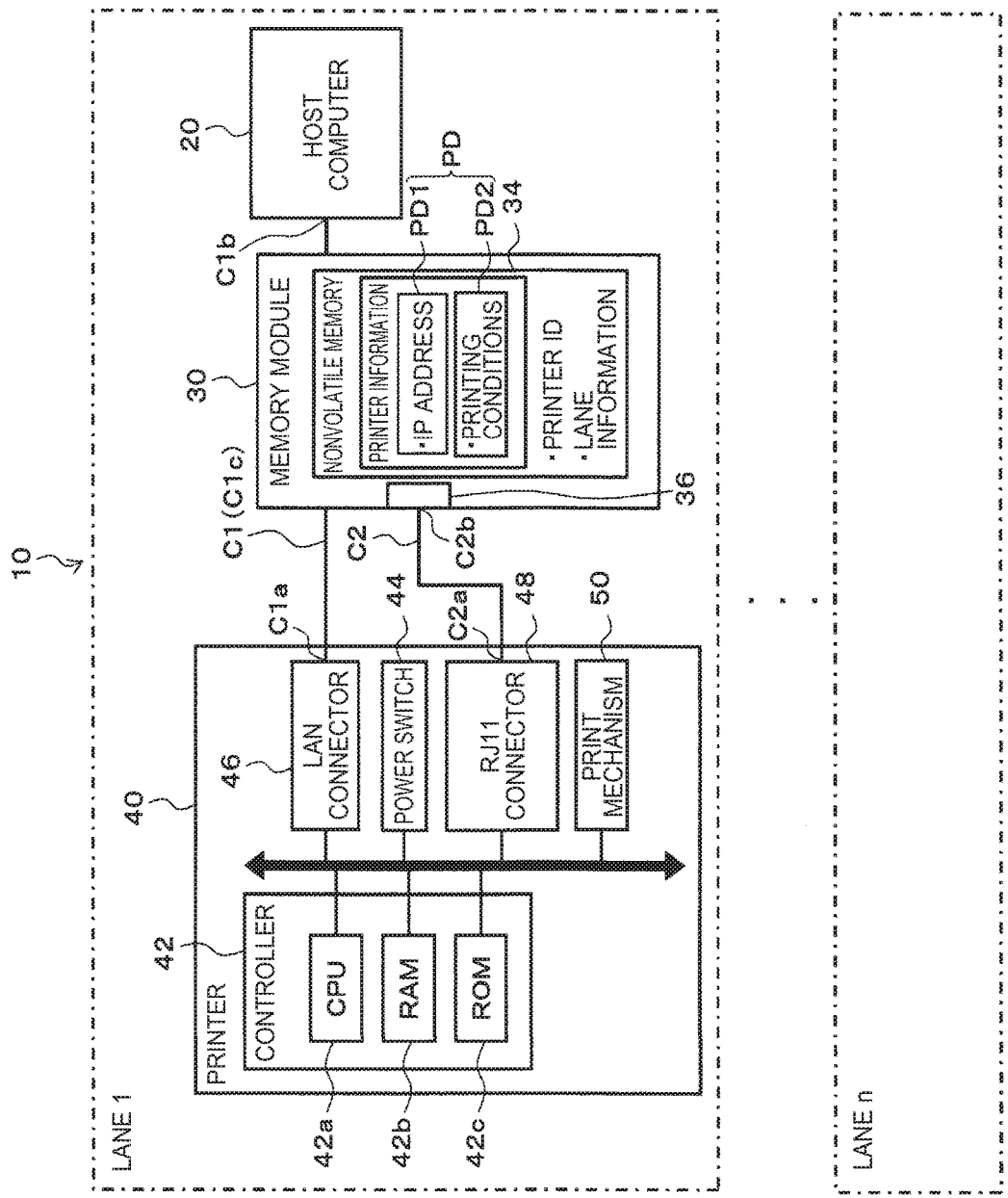
FIG. 1 illustrates the configuration of a POS system 10 in which the printer control method of the invention is used.

Preferred embodiments of the present invention are described below with reference to the accompanying figures.

Note that like parts are identified by like reference numerals in the figures, and redundant description thereof is omitted or simplified.

The control method of a printer according to the invention is described briefly first.

FIG. 1 shows an example of the configuration of a POS system 10 to which the printer control method of the invention is applied.

The control method of a printer according to this embodiment is a method of controlling a printer 40 that has a LAN connector 46 (first interface) and an RJ11 connector 48 (a modular jack connector; second interface); can connect to a host computer 20 through the LAN connector 46 and a LAN cable C1 (first communication cable); and can connect through the RJ11 connector 48 and a modular cable C2 (second communication cable) to the nonvolatile memory 34 of a memory module 30 (memory storing printer information). The nonvolatile memory 34 of the memory module 30 is connected to the LAN cable C1 (see FIG. 3, FIG. 5). In other words, the nonvolatile memory 34 of the memory module 30 is physically attached to the LAN cable C1.

The control method of a printer according to this embodiment of the invention is typically used when replacing one printer 40 with another (replacement) printer 40, and is applied to the replacement printer 40. For example, in the POS system 10 shown in FIG. 1, when the printer 40 installed on a particular checkout lane (the first lane in this example) fails and the failed printer 40 is replaced with another printer 40 (the replacement printer 40) that operates normally, the control method of the invention is applied to the replacement printer 40.

More specifically, the printer control method of the invention reads printer information (which may also be referred to as the configuration or settings information) from the nonvolatile memory 34 of the memory module 30 at a specific time (such as when the power switch 44 of the replacement printer 40 turns on) through a modular cable C2 and RJ11 connector 48, and writes (sets) the printer information that was read in the replacement printer 40.

When replacing one printer 40 (referred to below as the original printer 40) with another printer 40 (referred to below as the replacement printer 40) in a supermarket or other store where the POS system 10 is deployed, the printer information (such as the IP address (a communication setting), and printing conditions such as the print speed, paper size, or color settings) must be set in the replacement printer 40. Typically, the printer information (such as the IP address and printing conditions) of the original printer 40 must be transferred to the replacement printer 40 (that is, the replacement printer 40 inherits the printer information from the original printer 40).

Because a supermarket or other store where the POS system 10 is deployed typically does not have an on-site technician, a non-technical user (such as a store employee) must be able to quickly and accurately set (transfer) the printer information from the original printer 40 in the replacement printer 40 when replacing a printer 40.

Unlike the conventional method described above, the printer control method of the invention enables even a non-technical user to quickly and accurately set (enables the replacement printer 40 to inherit) the printer information (such as the IP address and print conditions) in the replacement printer 40 because the nonvolatile memory 34 (memory module 30) is attached to the LAN cable C1, that is, the nonvolatile memory 34 (memory module 30) is physically attached to the LAN cable C1.

A POS system 10 in which the printer control method of the invention is deployed is described below with reference to the accompanying figures.

As shown in FIG. 1, the POS system 10 includes a host computer 20, memory module 30, and printer 40. The host computer 20, memory module 30, and printer 40 are installed at each checkout lane (lane 1 to lane n) in the supermarket or other store.

While not shown in the figures, the hardware configuration of the host computer 20 includes a CPU and RAM, ROM, a hard disk drive, and interfaces connected to the CPU through respective buses.

The printer 40 is connected to the host computer 20 through an interface (not shown in the figure). Also connected to the host computer 20 through appropriate interfaces are (not shown) a barcode reader for reading barcodes, a keyboard for inputting information including the payment amount received from the customer, and a display for displaying product name and price information, for example.

Figure 6:
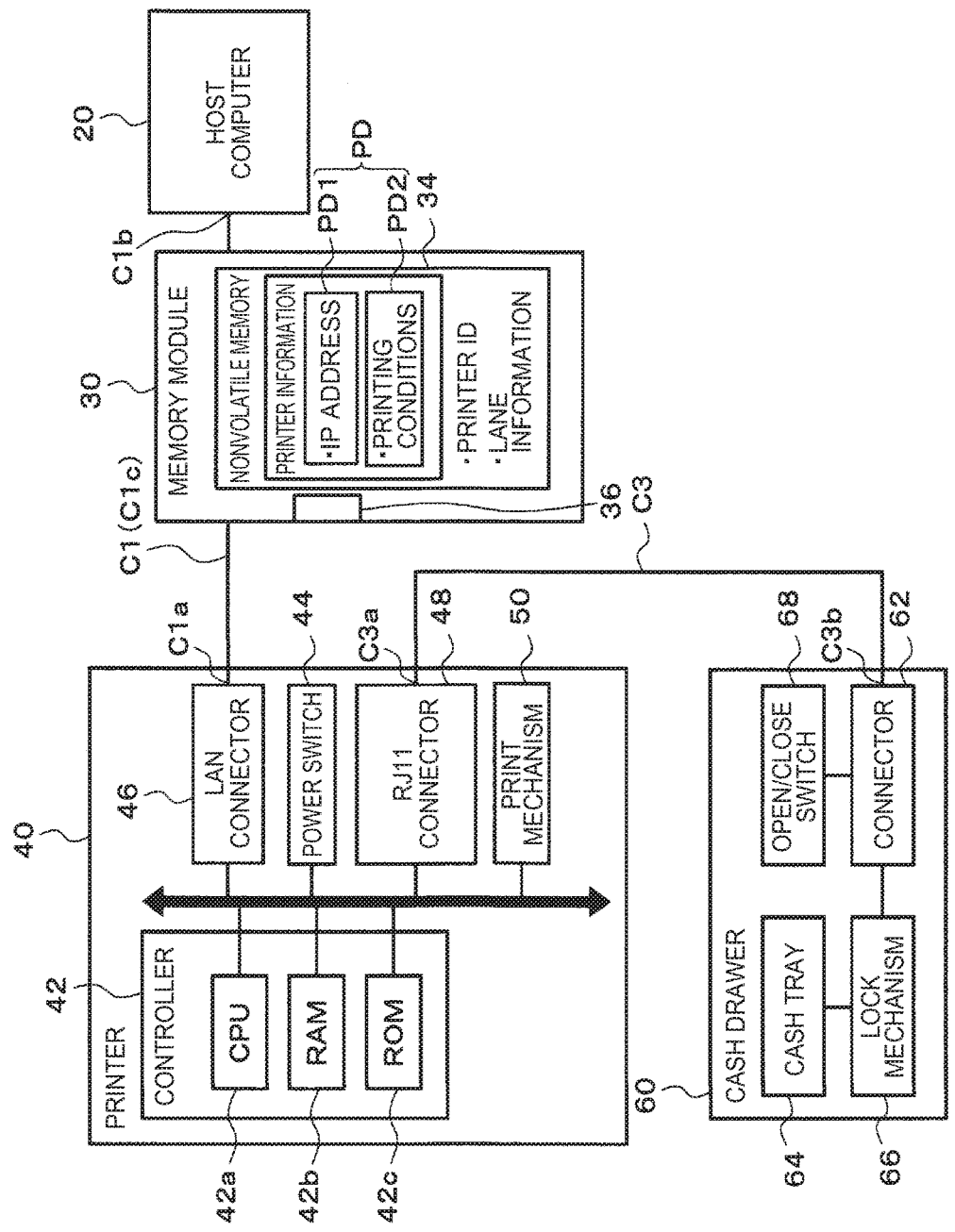
FIG. 6 shows an example of a cash drawer 60 connected to an RJ11 connector 48 instead of the memory module 30 in FIG. 1.

The functional configuration of the host computer 20 includes functions for executing a transaction process based on input from the barcode reader and keyboard; generating print data; communicating with the printer 40 through the LAN cable C1 (typically an Ethernet® cable); sending print data through the LAN cable C1 to the printer 40; sending a command to open the cash drawer 60 (see FIG. 6) through the LAN cable C1 to the printer 40; setting printer information (such as the IP address and print conditions) in the printer 40 (ROM 42c) through the LAN cable C1; and changing the printer information stored in the ROM 42c of the printer 40 through the LAN cable C1. Note that FIG. 6 shows an example in which the cash drawer 60 is connected to the RJ11 connector 48 instead of the nonvolatile memory 34 (memory module 30) in FIG. 1.

These functions are embodied mainly by the host computer 20 (CPU) running specific programs read from ROM or hard disk drive to RAM (more specifically, the operating system, POS application, printer driver, and utility for setting or changing printer information (settings)). While not shown in the figures, the host computer 20 is connected to the store network through an interface.

Figure 2:
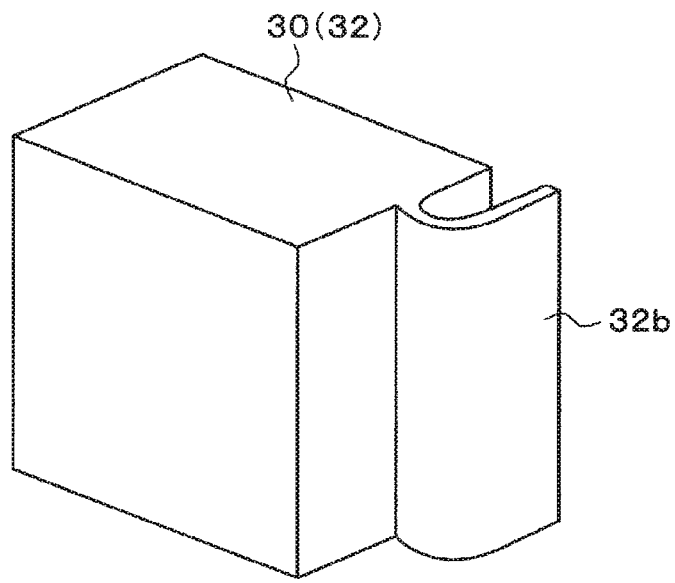
FIG. 2 is an oblique view of one example of a memory module 30.
Figure 3:
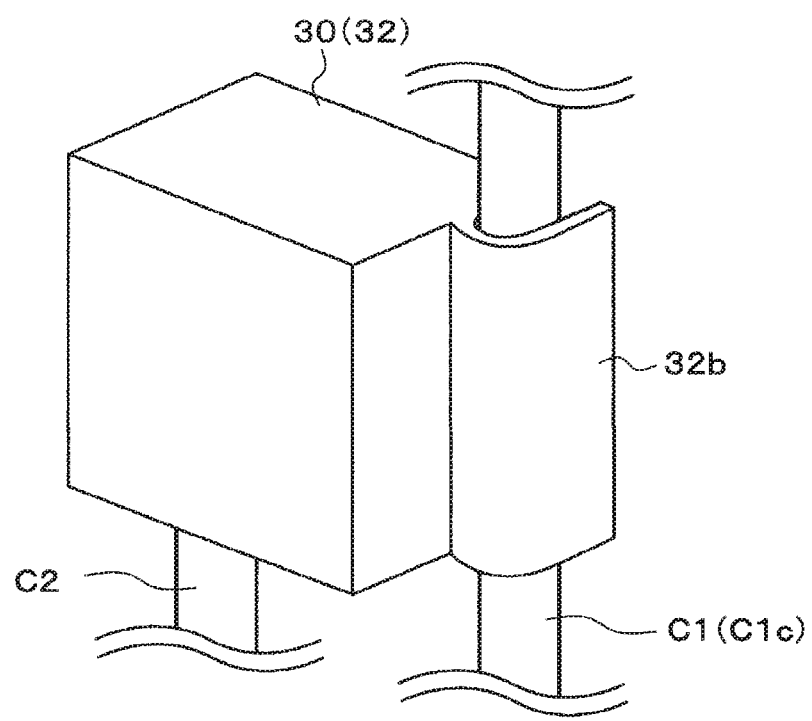
FIG. 3 is an oblique view of one example of a memory module 30.
Figure 4:
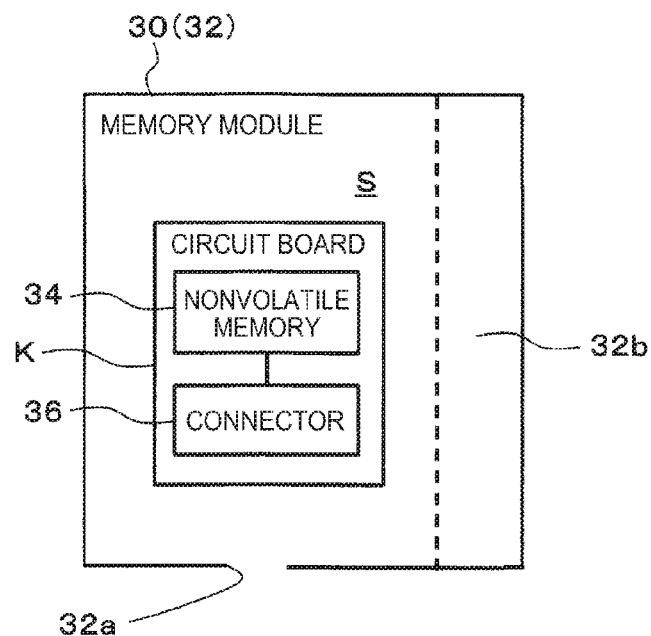
FIG. 4 is a block diagram illustrating an example of the hardware configuration of the memory module 30.
Figure 5:
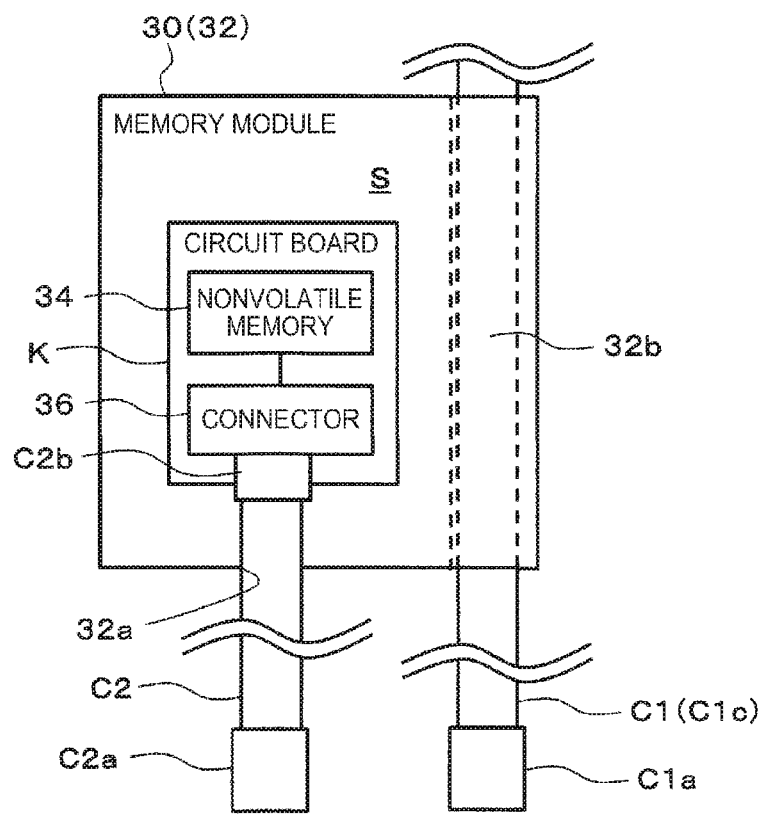
FIG. 5 is a block diagram illustrating an example of the hardware configuration of the memory module 30.

FIG. 2 and FIG. 3 are oblique views of the memory module 30, and FIG. 4 and FIG. 5 are block diagrams illustrating the hardware configuration of the memory module 30.

As shown in FIG. 2 and FIG. 4, the memory module 30 includes a case 32 that connects to a LAN cable C1, and a nonvolatile memory 34 inside the case 32. The nonvolatile memory 34 is installed to the LAN cable C1 by connecting the memory module 30 to the LAN cable C1 as described below.

The case 32 is a plastic housing, and has an internal space S where the nonvolatile memory 34 is housed as shown in FIG. 4. The case 32 has a through-hole 32a through which the internal space S communicates with the outside. As shown in FIG. 5, the modular cable C2 passes through this through-hole 32a.

The nonvolatile memory 34 is an EEPROM device, for example, and is mounted on a circuit board K with a connector 36 electrically connected to the EEPROM device. The circuit board K (nonvolatile memory 34 and connector 36) is installed in the internal space S of the case 32.

Figure 7:
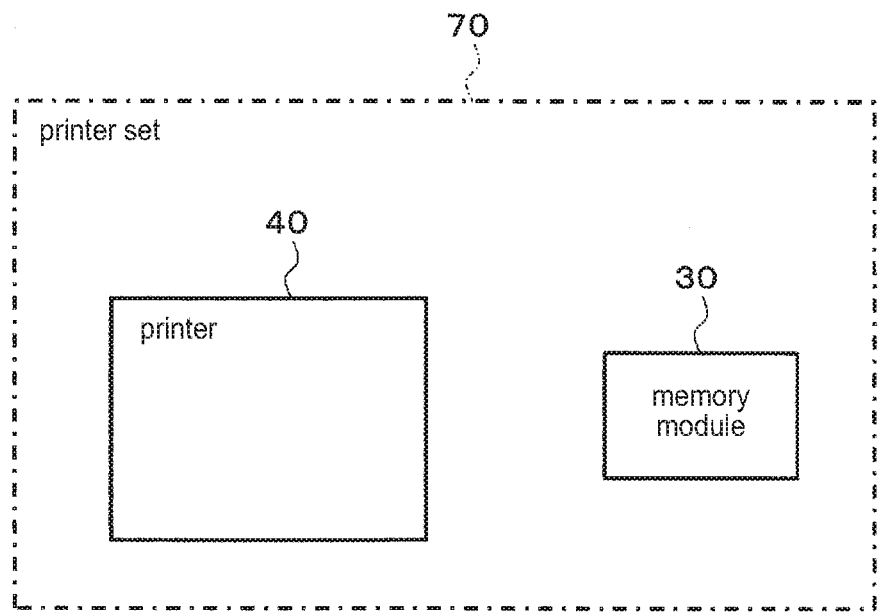
FIG. 7 illustrates an example of a printer set.

As shown in FIG. 7, the memory module 30 (nonvolatile memory 34) is provided (such as sold) with the printer 40 as a printer set 70. FIG. 7 shows an example of a printer set 70.

The memory module 30 (nonvolatile memory 34) is connected to the LAN cable C1 as shown in FIG. 3 and FIG. 5 by the buyer.

The means of attaching (connecting) the memory module 30 (nonvolatile memory 34) to the LAN cable C1 is, for example, a recess 32*b* that is disposed to the case 32 and U-shaped in cross section. As shown in FIG. 3, by fitting the LAN cable C1 (cable C1*c*) into the recess 32*b*, the memory module 30 (nonvolatile memory 34) is attached to the LAN cable C1.

The means of attaching the nonvolatile memory 34 to the LAN cable C1 is obviously not so limited, and may be a clip (not shown in the figure), adhesive, or screw disposed to the case 32 to hold the LAN cable C1, or other type of fastener or connector.

As shown in FIG. 1, printer information PD, a printer ID, and lane information are stored in the nonvolatile memory 34. The printer information PD includes at least one of the IP address PD1 and printing conditions PD2.

The IP address PD1 is a static IP address assigned to the printer 40 (or the lane where the printer 40 is used). The printing conditions PD2 may include the paper width, print density, print speed, font settings, and margin settings. The printer ID is identification information (such as the serial number) uniquely assigned to the printer 40. The lane information is identification information uniquely assigned to the lane where the printer 40 is located.

The connector 36 is a connector provided for connecting the nonvolatile memory 34 to the printer 40.

As shown in FIG. 1, the nonvolatile memory 34 is connected to the printer 40 (RJ11 connector 48) by a modular cable C2. More specifically, the plug C2*a* of the modular cable C2 is inserted to the printer 40 (RJ11 connector 48), and another plug C2*b* is inserted to the nonvolatile memory 34 (connector 36).

One example of a printer 40 according to this embodiment is shown in FIG. 1.

The printer 40 in this example is a receipt printer (such as a dot impact, thermal, or inkjet printer), and as shown in FIG. 1 the hard configuration of the printer 40 includes a controller 42 and a power switch 44, LAN connector 46, RJ11 connector 48, and print mechanism 50 connected through a bus to the controller 42.

The controller 42 includes a CPU 42*a*, RAM 42*b*, and ROM 42*c*. The ROM 42*c* if flash ROM or other type of nonvolatile memory device, and includes a storage area for storing the IP address PD1, which can be set or changed by the printer information configuration unit 50*b* (printer information configurator 50*b*) described below (or an operation of the host computer 20), and a storage area (such as a memory switch) for storing printing conditions PD2 that are set or changed by an operation of the host computer 20 (or an operation of the printer 40). A program such as firmware (control program), the printer ID, and lane information are stored in the ROM 42*c*. The printer ID and lane information are written at a specific time to nonvolatile memory 34 through the modular cable C2 and RJ11 connector 48. The replacement history and other information about the printer 40 at each lane can be known by referencing (or printing) the printer ID and lane information written (stored) in nonvolatile memory 34.

The power switch 44 is a power supply switch for turning the power supply to the printer 40 on and off.

The LAN connector 46 is a connector for connecting the printer 40 to the host computer 20. The printer 40 (LAN connector 46) and host computer 20 can be connected by a LAN cable C1 as shown in FIG. 1. More specifically, one plug C1*a* of the LAN cable C1 is inserted to the printer 40 (LAN connector 46), and the other plug C1*b* is connected to the host computer 20.

The RJ11 connector 48 is a connector (a drawer kick connector) for connecting the cash drawer 60 (FIG. 6) to the printer 40. As shown in FIG. 6, the printer 40 (RJ11 connector 48) and cash drawer 60 (connector 62) can be connected by a cash drawer connector cable C3. More specifically, one plug C3*a* of the cash drawer connector cable C3 connects to the printer 40 (RJ11 connector 48), and the other plug C3*b* connects to the cash drawer 60 (connector 62).

In this embodiment of the invention the RJ11 connector 48 (drawer kick connector) is also used as the connector for connecting the nonvolatile memory 34. As shown in FIG. 1, the RJ11 connector 48 and nonvolatile memory 34 can connect through the modular cable C2. More specifically, one plug C2*a* of the modular cable C2 connects to the printer 40 (RJ11 connector 48), and the other plug C2*b* connects to the nonvolatile memory 34 (connector 36.

The print mechanism 50 comprises a printhead, paper conveyance mechanism, and paper cutter mechanism (none shown in the figures), for example.

Figure 8:
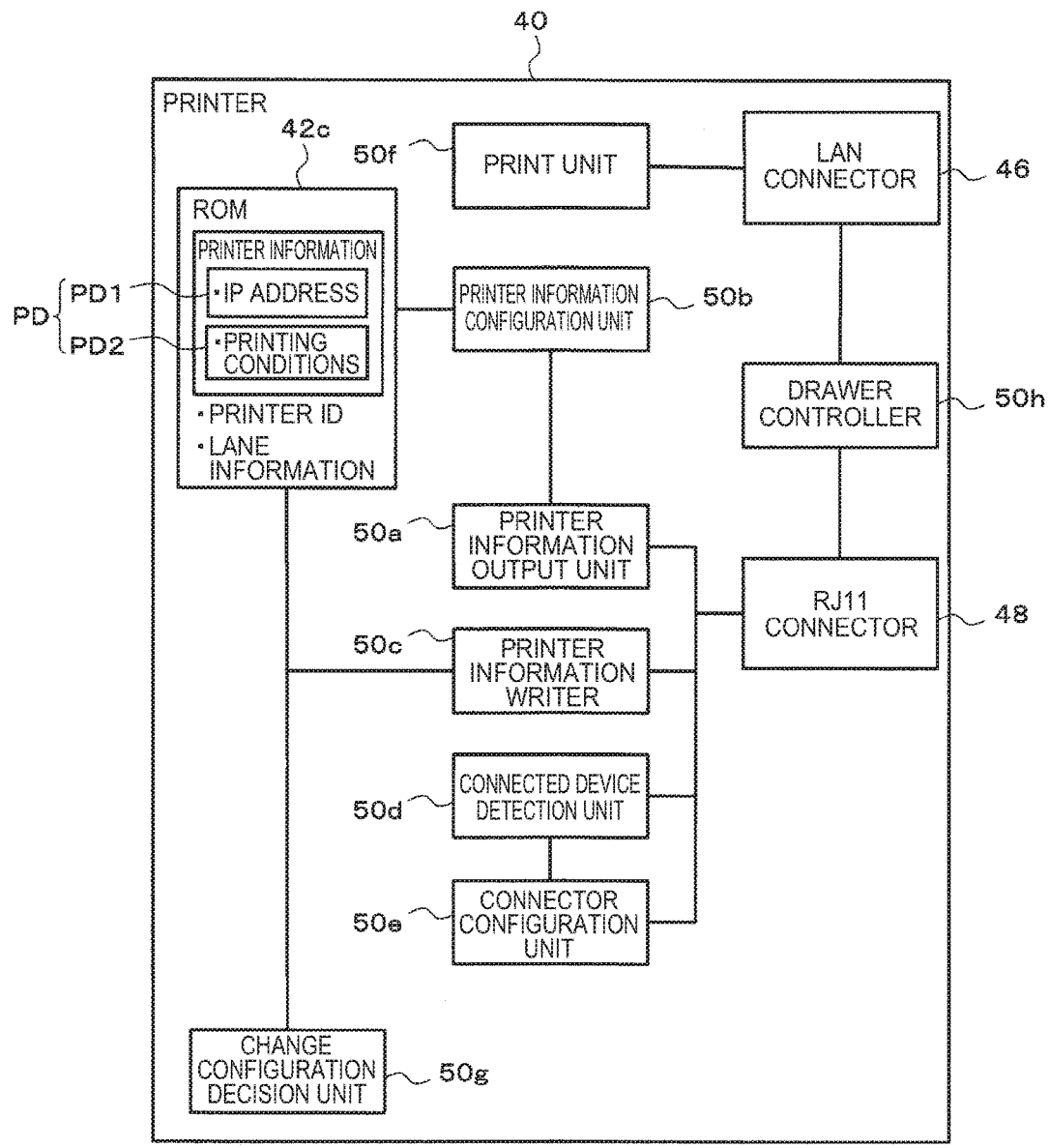
FIG. 8 is a block diagram showing an example of the functional configuration of a printer 40.

FIG. 8 is a block diagram of one example of the functional configuration of the printer 40.

As shown in FIG. 8, the functional configuration of a printer 40 according to this embodiment includes a printer information output unit 50*a* (a printer information outputter 50*a*), printer information configuration unit 50*b*, printer information writer 50*c*, connected device detection unit 50*d* (device detector 50*d*), connector configuration unit 50*e* (connector configurator 50*e*), print unit 50*f* (print mechanism 50*f*), change configuration decision unit 50*g* (change configuration determiner 50*g*), and drawer controller 50*h*.

These functions are embodied by the printer 40 (CPU 42*a*) reading and running a specific program, such as firmware, read from ROM 42*c* to RAM 42*b*.

At a specific time, the printer information output unit 50*a* reads the printer information PD from nonvolatile memory 34 through the modular cable C2 and RJ11 connector 48.

This specific time is when the RJ11 connector 48 and nonvolatile memory 34 are connected through the modular cable C2, and the power switch 44 of the printer 40 turns on.

The printer information configuration unit 50*b* writes the printer information PD read from the printer information output unit 50*a* in the printer 40. More specifically, the printer information configuration unit 50*b* stores the printer information PD read by the printer information output unit 50*a* to ROM 42*c* in the printer 40.

The printer information writer 50*c* writes the printer information PD to nonvolatile memory 34 through the modular cable C2 and RJ11 connector 48.

For example, when the change configuration decision unit 50*g* determines that at least part of the printer information PD stored in the ROM 42*c* of the printer 40 changed, the printer information writer 50*c* writes the updated printer information PD to the nonvolatile memory 34 through the modular cable C2 and RJ11 connector 48.

The connected device detection unit 50*d* detects if the nonvolatile memory 34 is connected to the RJ11 connector 48. This function is achieved as follows.

For example, the connected device detection unit 50*d* outputs a signal for reading specific data from nonvolatile memory 34 to the terminal embodying the RJ11 connector 48. When the specific data is read in response to the output signal, the connected device detection unit 50*d* detects that the nonvolatile memory 34 is connected to the RJ11 connector 48.

However, if the specific data is not read within a specific time, the connected device detection unit 50*d* determines the nonvolatile memory 34 is not connected to the RJ11 connector 48.

When a drawer Open signal (a HIGH signal of 2-5 V indicating the cash drawer 60 is open) is detected through the RJ11 connector 48, the connected device detection unit 50*d* also detects that a cash drawer 60 is connected to the RJ11 connector 48.

As described above, the connected device detection unit 50*d* detects what device is connected to the RJ11 connector 48.

When the connected device detection unit 50*d* detects that the nonvolatile memory 34 is connected to the RJ11 connector 48, the connector configuration unit 50*e* sets at least one pin (terminal; not shown) in the RJ11 connector 48 as the terminal for accessing the nonvolatile memory 34. The nonvolatile memory 34 is serial I/O memory. In this example there are six pins for accessing the nonvolatile memory 34: +3.3 V, CS (chip select: selection signal), DI (data IN: input signal), DO (data OUT: output signal), CLK (clock: data I/O synchronization signal), and GND.

When the connected device detection unit 50*d* detects that the cash drawer 60 is connected to the RJ11 connector 48 (or that connection of the nonvolatile memory 34 is not detected), the connector configuration unit 50*e* sets at least one pin of the RJ11 connector 48 as the cash drawer control terminal. In this embodiment, there are six cash drawer control terminals: frame GND, drawer kick-out drive signal 1 (output signal), drawer open/closed signal (input signal), +24 V, drawer kick-out drive signal 2 (output signal), and signal GND.

The print unit 50*f* controls the print mechanism 50 to print a receipt based on the print data (and the print conditions stored in ROM 42*c*) received from the host computer 20.

The change configuration decision unit 50*g* determines whether or not any part of the printer information stored in the ROM 42*c* of the printer 40 changed.

Based on a command for opening the cash drawer 60 received from the host computer 20, the drawer controller 50*h* sends a control signal to the cash drawer 60 and opens the cash drawer 60.

FIG. 6 illustrates the configuration of a cash drawer 60 in this embodiment.

As shown in FIG. 6, the cash drawer 60 has a connector 62, cash tray 64, lock mechanism 66, and open/close switch 68.

The connector 62 is a connected for connecting the cash drawer 60 to the printer 40. The printer 40 (RJ11 connector 48) and cash drawer 60 (connector 62) can connect through the cash drawer connector cable C3 as shown in FIG. 6. More specifically, one plug C3*a* of the cash drawer connector cable C3 connects to the printer 40 (RJ11 connector 48), and the other plug C3*b* connects to the cash drawer 60 (connector 62).

The lock mechanism 66 can be unlocked by driving a plunger or other actuator by means of a control signal sent from the printer 40 through the cash drawer connector cable C3 (and RJ11 connector 48). The cash drawer 60 (more specifically, the cash tray 64) can then be opened by the force of a spring (not shown in the figure). The cash tray 64 is closed by being pushed in by hand until the lock mechanism 66 engages.

The open/close switch 68 is a switch that detects whether the cash drawer 60 (more specifically, the cash tray 64) is open or closed. The open/closed state of the cash drawer 60 is detected based on the printer 40 side by a drawer open or drawer closed signal received through the cash drawer connector cable C3 (and RJ11 connector 48).

An example of the printer control method according to this embodiment is described next with reference to FIG. 9.

Figure 9:
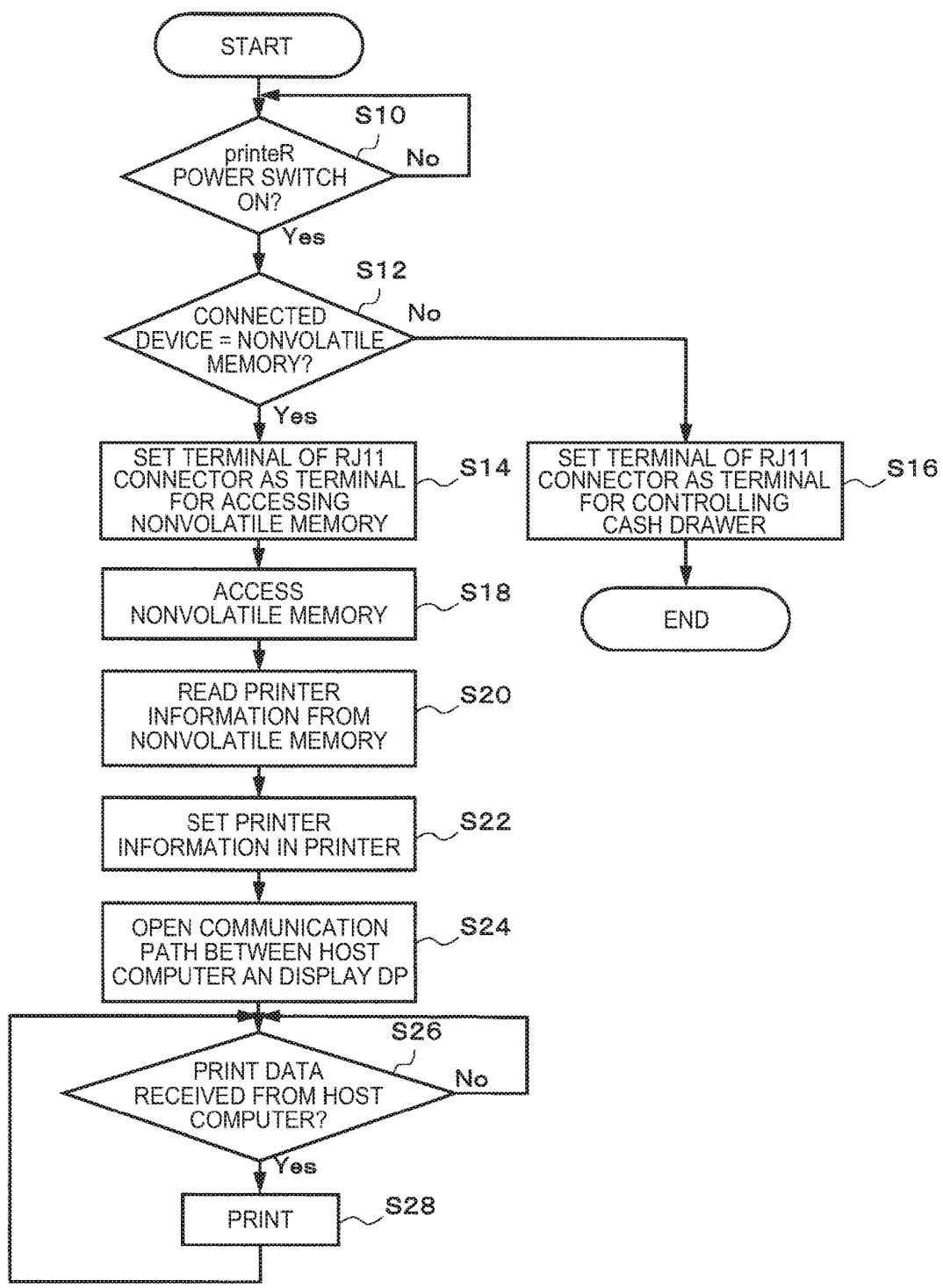
FIG. 9 is a flowchart of one example of a printer control method according to the invention.

FIG. 9 is a flow chart describing an example of the printer control method according to this embodiment.

The control method of a printer according to this embodiment of the invention is described below using the example of the printer 40 installed on a particular checkout lane (the first lane in this example) in the POS system 10 shown in FIG. 1 failing and the failed printer 40 (referred to herein as the original printer 40) being replaced with another printer 40 (referred to herein as the replacement printer 40) that operates normally.

The process shown in FIG. 9 is a process executed by the replacement printer 40, for example, particularly by the (CPU 42*a*) of the replacement printer 40 executing a specific program, such as firmware, copied from ROM 42*c* to RAM 42*b*.

Note that the following description assumes that the IP address PD1 assigned to the lane and the printing conditions PD2 (the printing conditions PD2 stored in the ROM 42*c* of the original printer 40) were previously stored in nonvolatile memory 34. Note further that the printing conditions PD2 are written to nonvolatile memory 34 as a result of the original printer 40 having executed the process described below (a process of writing the printing conditions PD2 stored in the ROM 42*c* of the original printer 40 to nonvolatile memory 34; see FIG. 10).

When the printer 40 installed on a specific lane (lane 1 in this example) malfunctions, the original printer 40 is replaced with the replacement printer 40 by the procedure described below before the process shown in FIG. 9.

First, the user connects the original printer 40 (LAN connector 46) to the host computer 20. More specifically, the user disconnects the LAN cable C1 from the original printer 40 (LAN connector 46), and connects the disconnected LAN cable C1 to the replacement printer 40 (LAN connector 46). The user also connects the replacement printer 40 (RJ11 connector 48) to the nonvolatile memory 34. More specifically, the user disconnects the modular cable C2 from the original printer 40 (RJ11 connector 48), and connects the disconnected modular cable C2 to the replacement printer 40 (RJ11 connector 48). This operation has the following effect because the nonvolatile memory 34 storing the printer information PD is connected to the LAN cable C1 (FIG. 3, FIG. 5), that is, the nonvolatile memory 34 storing the printer information PD is physically connected to the LAN cable C1.

First, preparing a separate external memory device each time a printer 40 is replaced is not necessary. Second, managing the nonvolatile memory 34 storing the printer information PD is easier than in the related art, and suitable nonvolatile memory 34 (memory module 30) storing the printer information PD that should be written to the replacement printer 40 can be prepared more quickly than in the related art. Third, there is no possibility that nonvolatile memory 34 (memory module 30) other than the nonvolatile memory 34 (memory module 30) storing the printer information PD that should be written to the replacement printer 40 will be mistakenly prepared, and as a result the correct printer information can be reliably set in the replacement printer 40. Fourth, there is no chance of losing the nonvolatile memory 34 (memory module 30).

As described above, because the nonvolatile memory 34 storing the printer information PD is installed to the LAN cable C1, that is, because the nonvolatile memory 34 storing the printer information PD is physically attached to the LAN cable C1, even a non-technical user can quickly and accurately transfer the printer information PD of the original printer 40 (such as the IP address and other communication conditions PD1, and the printing conditions PD2) to the replacement printer 40 when replacing a printer 40.

Note that the connections between the replacement printer 40 (LAN connector 46) and the host computer 20, and between the replacement printer 40 (RJ11 connector 48) and nonvolatile memory 34, are made while the power switch 44 of the replacement printer 40 is off.

The power switch 44 of the replacement printer 40 is then turned on.

When the power switch 44 of the replacement printer 40 turns on (step S10: Yes), the replacement printer 40 (connected device detection unit 50*d*) detects that the nonvolatile memory 34 is connected to the RJ11 connector 48 (step S12).

Because the nonvolatile memory 34 is connected to the RJ11 connector 48, the printer 40 (connected device detection unit 50*d*) detects that the nonvolatile memory 34 is connected to the RJ11 connector 48 (step S12: Yes).

Next, when connection of the nonvolatile memory 34 to the RJ11 connector 48 is detected (step S12: Yes), the replacement printer 40 (connector configuration unit 50*e*) sets at least one pin of the RJ11 connector 48 as the terminal for accessing the nonvolatile memory 34 (step S14). In this example, the frame GND terminal of the RJ11 connector 48 is assigned as the CS pin of the nonvolatile memory 34; the terminal of the drawer kick-out drive signal 1 (output signal) or drawer kick-out drive signal 2 (output signal) is assigned to the CLK terminal and a clock signal is output; and the drawer open/closed signal (input signal) is assigned as the DI terminal so that input data can be acquired synchronized to the clock signal. A connection can then be detected if specific data stored in the nonvolatile memory 34 can then be acquired.

Note that if connection of a cash drawer 60 to the RJ11 connector 48 is detected (or that nonvolatile memory 34 is not connected to the RJ11 connector 48 is detected) (step S12: No), the replacement printer 40 (connector configuration unit 50*e*) sets at least one pin of the RJ11 connector 48 as the cash drawer control terminal (step S16).

Next, the printer 40 (printer information output unit 50*a*) accesses the nonvolatile memory 34 (step S18), and reads the printer information PD from the nonvolatile memory 34 through the modular cable C2 and RJ11 connector 48 (step S20).

Because the IP address PD1 assigned to the lane and the printing conditions PD2 (the printing conditions PD2 stored in the ROM 42*c* of the original printer 40) are stored in the nonvolatile memory 34, the IP address PD1 and printing conditions PD2 are read. Note that if configured to read either or both the IP address PD1 and printing conditions PD2, either or both the IP address PD1 and printing conditions PD2 are read based on the setting.

As described above, the printer information output unit 50*a* reads the printer information PD from the nonvolatile memory 34 through the modular cable C2 and RJ11 connector 48 at a specific time, which in this example is when the power switch 44 of the replacement printer 40 turns on after the RJ11 connector 48 and nonvolatile memory 34 are connected through the modular cable C2 (step S10: Yes).

Next, the replacement printer 40 (printer information configuration unit 50*b*) sets the printer information PD read by the printer information output unit 50*a* in the replacement printer 40. More specifically, the printer information configuration unit 50*b* stores the printer information PD read by the printer information output unit 50*a* in the ROM 42*c* of the replacement printer 40 (step S22).

As described above, the IP address PD1 and printing conditions PD2 (the printing conditions PD2 stored in the ROM 42*c* of the original printer 40) are thus set quickly and accurately in (inherited by) the replacement printer 40.

Next, based on the IP address PD1 set in the replacement printer 40, a communication path (such as a TCP connection) is opened between the host computer 20 and replacement printer 40 by a known method (step S24).

Thereafter, the replacement printer 40 communicates with the host computer 20 through the LAN cable C1 based on the IP address PD1 stored in the replacement printer 40 as described above.

If print data is then received from the host computer 20 through the LAN cable C1 (and LAN connector 46) (step S26: Yes), the replacement printer 40 (print unit 50*f*) controls the print mechanism 50 to print a receipt based on the received print data and the printing conditions PD2 set in the replacement printer 40 as described above (step S28).

An example of the process of writing the printing conditions PD2 stored in the ROM 42*c* of the original printer 40 to nonvolatile memory 34 is described next with reference to FIG. 10.

Figure 10:
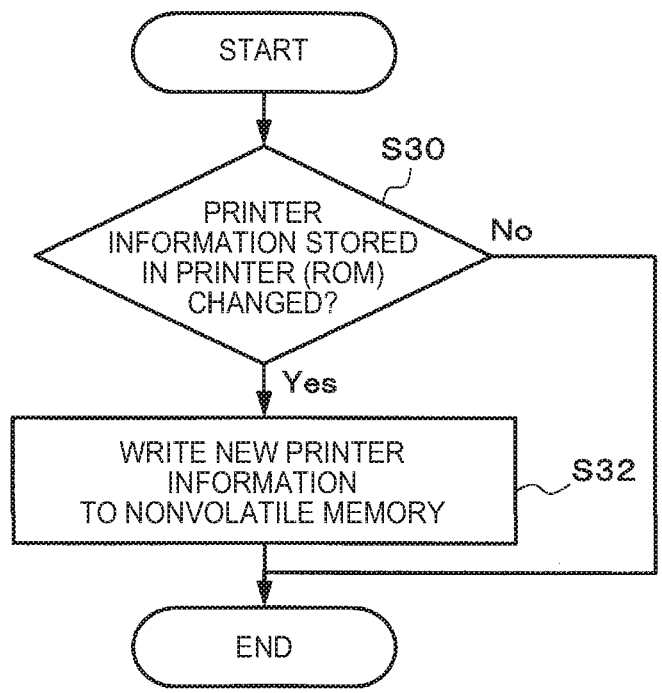
FIG. 10 is a flow chart of an example of a process writing a printing condition PD2 stored in the ROM 42c of the printer 40 to nonvolatile memory 34.

FIG. 10 is a flow chart of an example of the process of writing printing conditions PD2 stored in the ROM 42*c* of the original printer 40 to the nonvolatile memory 34.

The process shown in FIG. 10 is, for example, a process executed by the original printer 40 (and by the replacement printer 40), and is embodied primarily by the original printer 40 (CPU 42*a*) reading and running a specific program, such as firmware, copied from ROM 42*c* to RAM 42*b*.

The printing conditions PD2 stored in the ROM 42*c* of the original printer 40 is written to nonvolatile memory 34 every time any part of the printing conditions PD2 changes. More specifically, the printing conditions PD2 are written as described below. Note that parts of the printing conditions PD2 stored in the ROM 42*c* of the original printer 40 may be changed based on an operation of the host computer 20 (or operation of the original printer 40).

First, the original printer 40 (change configuration decision unit 50*g*) determines whether or not part of the printing conditions PD2 stored in the ROM 42*c* of the original printer 40 changed (step S30).

If part of the printing conditions PD2 stored in the ROM 42*c* of the original printer 40 changed (by an operation of the host computer 20, for example) (step S30: Yes), the original printer 40 (printer information writer 50*c*) writes the updated printing conditions PD2 to the nonvolatile memory 34 through the modular cable C2 and RJ11 connector 48 (step S32).

As described above, the printing conditions PD2 stored in the ROM 42*c* of the original printer 40 are written to nonvolatile memory 34 each time part of the printing conditions PD2 changes (is overwritten, for example).

An example of control of the cash drawer 60 is described next with reference to FIG. 11.

Figure 11:
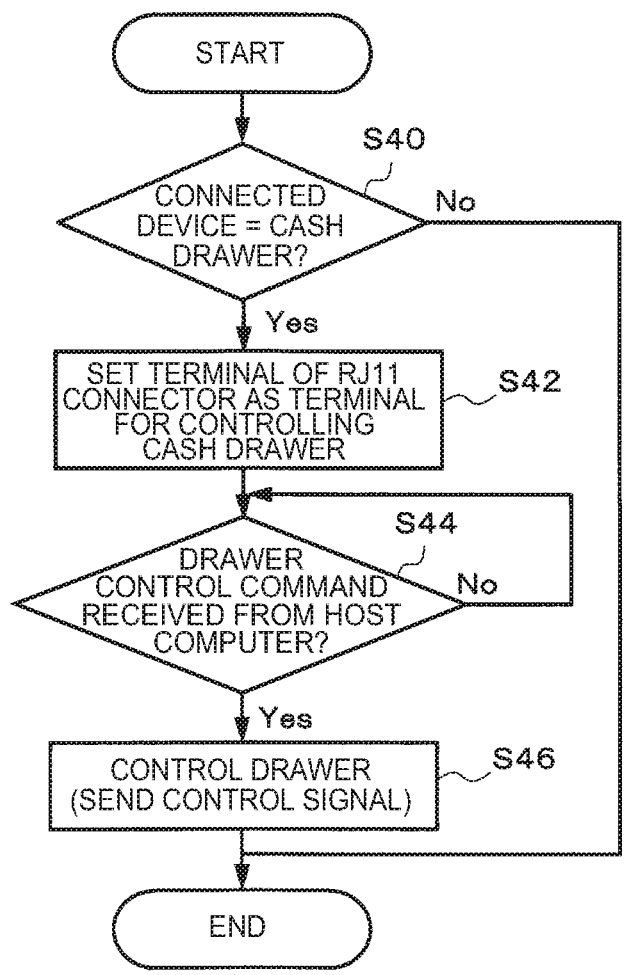
FIG. 11 is a flow chart describing an example of controlling a cash drawer 60.

FIG. 11 is a flow chart describing an example of control of the cash drawer 60.

The process shown in FIG. 11 is, for example, a process executed by the replacement printer 40, and is embodied primarily by the replacement printer 40 (CPU 42a) reading and running a specific program, such as firmware, copied from ROM 42c to RAM 42b.

The cash drawer 60 is connected to the printer 40 (RJ11 connector 48) by the steps described below before the process shown in FIG. 11 starts.

First, the modular cable C2 is disconnected from the replacement printer 40 (RJ11 connector 48) after a communication path is opened between the host computer 20 and the replacement printer 40 (LAN connector 46) by the process shown in FIG. 9 (after step S24).

Next, the replacement printer 40 (RJ11 connector 48) and cash drawer 60 (connector 62) are connected through the cash drawer connector cable C3.

Next, the replacement printer 40 (connected device detection unit 50d) detects whether or not a cash drawer 60 is connected to the RJ11 connector 48 (step S40).

The connected device detection unit 50d can detect if a cash drawer 60 is connected to the RJ11 connector 48 by regularly detecting if a device is connected to the RJ11 connector 48. For example, because the cash drawer 60 is normally closed, that a cash drawer 60 is connected is detected when the drawer open/closed signal, which is input to the input signal terminal of the RJ11 connector 48, is a Closed signal.

Because the cash drawer 60 is connected to the RJ11 connector 48 at this time, the replacement printer 40 (connected device detection unit 50d) detects that the cash drawer 60 is connected to the RJ11 connector 48 (step S40: Yes).

When it is detected that the cash drawer 60 is connected to the RJ11 connector 48 (step S40: Yes), the replacement printer 40 (connector configuration unit 50e) sets at least one pin of the RJ11 connector 48 as the terminal for controlling the cash drawer (step S42).

If it is detected that the cash drawer 60 is not connected to the RJ11 connector 48 (step S40: No), the process ends.

When a command (drawer control command) to open the cash drawer 60 is then received from the host computer 20 through the LAN cable C1 (and LAN connector 46) (step S44: Yes), the replacement printer 40 (drawer controller 50h) sends a control signal (a signal to drive the plunger) through the cash drawer connector cable C3 to the cash drawer 60 based on the command received to open the cash drawer 60 (step S46), and opens the cash drawer 60.

The printer control method according to this embodiment of the invention differs from the related art by having nonvolatile memory 34 storing the printer information PD directly connected to the LAN cable C1, that is, nonvolatile memory 34 storing the printer information PD physically attached to the LAN cable C1, and as a result has the following effect.

First, preparing a separate external memory device each time a printer 40 is replaced is not necessary. Second, managing the nonvolatile memory 34 storing the printer information PD is easier than in the related art, and suitable nonvolatile memory 34 (memory module 30) storing the printer information PD that should be written to the replacement printer 40 can be prepared more quickly than in the related art. Third, there is no possibility that nonvolatile memory 34 (memory module 30) other than the nonvolatile memory 34 (memory module 30) storing the printer information PD that should be written to the replacement printer 40 will be mistakenly prepared, and as a result the correct printer information can be reliably set in the replacement printer 40. Fourth, there is no chance of losing the nonvolatile memory 34 (memory module 30).

As described above, because the nonvolatile memory 34 storing the printer information PD is installed to the LAN cable C1, that is, because the nonvolatile memory 34 storing the printer information PD is physically attached to the LAN cable C1, in the printer control method according to this embodiment, even a non-technical user can quickly and accurately transfer the printer information PD of the original printer 40 (such as the IP address PD1 and the printing conditions PD2) to the replacement printer 40 when replacing a printer 40.

Note that because the printer 40 and printer set 70 according to this embodiment have the same configuration as the control method of a printer according to this embodiment, they also have the same effect as the printer control method of the invention, that is, enable even non-technical users to quickly and accurately set the printer information PD (such as the IP address PD1 and printing conditions PD2) in a printer 40.

The printer control method of the invention also enables non-technical users to quickly and accurately set printer information PD that was changed on the original printer 40 (or changed by an operation of the host computer 20) in the replacement printer 40.

The printer control method according to this embodiment also enables setting (transferring) printer information of the original printer 40 in the replacement printer 40 by the extremely simple process of disconnecting the LAN cable C1 from the LAN connector 46 of the original printer 40, connecting the disconnected LAN cable C1 to the LAN connector 46 of the replacement printer 40, disconnecting the modular cable C2 from the RJ11 connector 48 of the original printer 40, and connecting the disconnected modular cable C2 to the RJ11 connector 48 of the replacement printer 40.

Furthermore, because the printer control method according to this embodiment uses a LAN connector 46 and a RJ11 connector 48, a LAN cable C1 (typically an Ethernet® cable) can be used as the first communication cable, a modular cable C2 can be used as the second communication cable, and highly reliably communication can be achieved at a low cost.

Furthermore, because the printer control method according to this embodiment uses the RJ11 connector 48 (drawer kick-out connector) provided for connecting a cash drawer 60 to a printer 40 as the connector to which the nonvolatile memory 34 connects, a separate, dedicated connector for connecting the nonvolatile memory 34 is not necessary, and the parts count and number of assembly steps can be reduced accordingly.

The printer control method according to this embodiment detects if a nonvolatile memory 34 is connected to the RJ11 connector 48, assigns one pin of the RJ11 connector 48 as a terminal for accessing the nonvolatile memory 34 or as a terminal for controlling the cash drawer based on the detected result, and eliminates the need to configure the appropriate terminals manually.

The printer control method according to this embodiment can set the printer information PD in the replacement printer 40 by the extremely simple process of connecting the RJ11 connector 48 and nonvolatile memory 34 through the modular cable C2, and then turning the power switch 44 of the replacement printer 40 on. The printer information PD of the original printer 40 can also be set in the replacement printer 40 by the extremely simple process of connecting the RJ11 connector 48 and nonvolatile memory 34 through the modular cable C2 when the power switch 44 of the printer 40 is on.

The printer 40 is described in the foregoing embodiment as a receipt printer, but the invention is not so limited and can be applied to printers other than receipt printers.

The printer control method according to this embodiment is described as being used when the printer 40 installed at a specific checkout lane (lane 1 in the example above) in the POS system 10 shown in FIG. 1 malfunctions, the malfunctioning printer 40 is replaced with a separate, normally operating printer 40, and the printer control method is applied to the replacement printer 40, but the invention is not so limited.

For example, when a new printer 40 is installed at a specific lane (such as lane n+1) in the POS system 10 shown in FIG. 1, the invention can also be applied to the newly installed printer 40.

Furthermore, the printer information output unit 50a is described in the above embodiment as reading the printer information PD from the nonvolatile memory 34 through the modular cable C2 and RJ11 connector 48 at a specific time, that is, when the RJ11 connector 48 and nonvolatile memory 34 are connected by the modular cable C2 and the power switch 44 of the replacement printer 40 is then turned on (step S10: Yes), but the invention is not so limited.

For example, the printer information output unit 50a may read the printer information PD from the nonvolatile memory 34 through the modular cable C2 and RJ11 connector 48 at a different specific time, such as when the power switch 44 of the replacement printer 40 is on and it is then detected that the RJ11 connector 48 and the nonvolatile memory 34 of the memory module 30 were connected through the modular cable C2. Note that when the power switch 44 of the printer 40 is on, whether or not the nonvolatile memory 34 of the memory module 30 was connected to the RJ11 connector 48 can be detected by the connected device detection unit 50d regularly detecting the device connected to the RJ11 connector 48, for example.

Furthermore, when it is determined that any part of the printing conditions PD2 stored in the ROM 42c of the original printer 40 changed (such as being changed based on an operation of the host computer 20) (step S30: Yes), the printer 40 (printer information writer 50c) in the above embodiment writes the updated printing conditions PD2 to the nonvolatile memory 34 through the modular cable C2 and RJ11 connector 48 (step S32), but the invention is not so limited.

For example, the original printer 40 may write the updated IP address PD1 to nonvolatile memory 34 through the modular cable C2 and RJ11 connector 48 when it is determined that the IP address PD1 stored in the ROM 42c of the original printer 40 was changed (such as is changed based on information from the host computer 20).

The IP address PD1 and printing conditions PD2 stored in the ROM 42c of the original printer 40 can thus be quickly and accurately set in (transferred to) the replacement printer 40 by the process described in FIG. 9.

The above embodiment describes an example using an IP address, but the invention is not so limited and other types of network address information can be used.

The invention being thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A control method of a printer having a first interface and a second interface, the first interface connecting to a host computer through a first communication cable to which memory is physically attached, the second interface connecting to a cash drawer or the memory storing printer information through a second communication cable, the control method comprising:
    reading the printer information from the memory which is physically attached to the first communication cable, through the second communication cable and second interface;
    setting the read printer information in the printer, at a specific time;
    when the second interface connects to the cash drawer:
        detecting the cash drawer,
        setting at least one pin of the second interface as a terminal for controlling the cash drawer,
        receiving a command from the host computer through the first interface and the first communication cable, and
        sending a signal to the cash drawer through the second interface and the second communication cable,
    wherein when the second interface connects to the memory, the memory is housed in a case having a recess, and the case is physically attached to the first communication cable by fitting the first communication cable into the recess.

2. The control method of a printer described in claim 1, wherein:
    the printer information includes at least one of an IP address or a printing condition.

3. The control method of a printer described in claim 1, further comprising:
    determining if at least part of the printer information set in the printer changed; and
    when it is determined that at least part of the printer information set in the printer changed, writing the updated printer information to the memory through the second communication cable and second interface.

4. The control method of a printer described in claim 3, wherein at least part of the printer information set in the printer may be changed based on information from the host computer.

5. The control method of a printer described in claim 3, further comprising:
    after the updated printer information is written to the memory,
    disconnecting the first communication cable from the first interface and connecting the disconnected first communication cable to the first interface of a printer other than the original printer;
    disconnecting the second communication cable from the second interface and connecting the disconnected second communication cable to the second interface of the other printer; and
    at a specific time, reading the updated printer information from the memory through the second communication cable and the second interface, and setting the updated printer information that was read in the other printer.

6. The control method of a printer described in claim 1, wherein
    the first interface is a LAN connector, and
    the second interface is an RJ11 connector.

7. The control method of a printer described in claim 1, wherein the second interface is an interface used to connect the cash drawer to the printer.

8. The control method of a printer described in claim 7, further comprising:
    detecting if the memory is connected to the second interface;
    setting at least one terminal in the second interface as a terminal used to access the memory when it is detected that the memory is connected to the second interface; and
    setting at least one terminal in the second interface as a terminal used to control the cash drawer when the cash drawer is detected to be connected to the second interface, or connection of the memory is not detected.

9. The control method of a printer described in claim 1, wherein:
    the specific time is
    when the power switch of the printer turns on while the second interface and the memory are connected by the second communication cable, or is
    when connection of the second interface to the memory by the second communication cable is detected while the power switch of the printer is on.

10. A printer comprising:
    a processor;
    a first interface configured to connect to a host computer through a first communication cable;
    memory storing printer information through a second communication cable;
    a second interface configured to connect to a cash drawer or the memory,
    wherein the processor is configured to
        read the printer information from the memory through the second communication cable and second interface at a specific time, and
        set the printer information read by the processor in the printer,
    wherein when the second interface is configured to connect to the memory;
        the memory is housed in a case, and
        the case has a recess and is physically attached to the first communication cable by tilting the first communication cable into the recess,
    wherein when the second interface is configured to connect to the cash drawer, the processor is configured to:
        detect the cash drawer,
        set at least one pin of the second interface as a terminal for controlling the cash drawer,
        receive a command from the host computer through the first interface and the first communication cable, and
        send a signal to the cash drawer through the second interface and the second communication cable.

11. The printer described in claim 10, wherein the printer information includes at least one of an IP address or a printing condition.

12. The printer described in claim 10, wherein the processor is further configured to:
    determine if at least part of the printer information set in the printer is changed, and
    write the updated printer information to the memory through the second communication cable and second interface when it is determined that at least part of the printer information set in the printer is changed.

13. The printer described in claim 12, wherein at least part of the printer information set in the printer may be changed based on information from the host computer.

14. The printer described in claim 12, wherein after the updated printer information is written to the memory,
    the first communication cable is disconnected from the first interface and the disconnected first communication cable is connected to the first interface of a printer other than the original printer, and
    the second communication cable is disconnected from the second interface and the disconnected second communication cable is connected to the second interface of the other printer,
    the processor of the other printer reads the updated printer information from the memory through the second communication cable and the second interface, and sets the updated printer information that was read in the other printer, at a specific time.

15. The printer described in claim 10, wherein
    the first interface is a LAN connector, and
    the second interface is an RJ11 connector.

16. The printer described in claim 10, wherein
    the second interface is an interface used to connect the cash drawer to the printer.

17. The printer described in claim 16, wherein the processor is further configured to:
    detect if the memory is connected to the second interface; and
    set at least one terminal in the second interface as a terminal used to access the memory when the detector detects that the memory is connected to the second interface, and
    set at least one terminal in the second interface as a terminal used to control the cash drawer when it is detected that the cash drawer is connected to the second interface, or it is not detected that the memory is connected.

18. The printer described in claim 10, wherein:
    the specific time is when the power switch of the printer turns on while the second interface and the memory are connected by the second communication cable, or
    is when connection of the second interface to the memory by the second communication cable is detected while the power switch of the printer is on.

19. The printer described in claim 17, wherein:
    the specific time is when the power switch of the printer is on and the detector determines the second interface was connected to the memory by the second communication cable.

20. A printer set comprising:
    the printer described in claim 10; and
    a memory module including a housing to which the first communication cable can connect, and the memory installed in the housing.

* * * * *